April 26, 1955 D. MacGREGOR Re. 23,985

VALVE CONSTRUCTION

Original Filed April 15, 1946 4 Sheets-Sheet 1

Inventor
David MacGregor

By Strauch + Hoffman
Attorneys

VALVE CONSTRUCTION

Original Filed April 15, 1946 4 Sheets-Sheet 2

Inventor
David MacGregor

By Strauch + Hoffman
Attorneys

VALVE CONSTRUCTION

Original Filed April 15, 1946 4 Sheets-Sheet 3

Inventor
David MacGregor

By Strauch + Hoffman
Attorneys

April 26, 1955 D. MacGREGOR Re. 23,985

VALVE CONSTRUCTION

Original Filed April 15, 1946 4 Sheets-Sheet 4

Inventor
David MacGregor

By Strauch & Hoffman
Attorneys

United States Patent Office

Re. 23,985

Reissued Apr. 26, 1955

23,985

VALVE CONSTRUCTION

David MacGregor, East Chicago, Ind., assignor to Edward Valves Incorporated, East Chicago, Ind., a corporation of Indiana Original No. 2,621,016, dated December 9, 1952, Serial No. 662,340, April 15, 1946. Application for reissue August 2, 1954, Serial No. 447,452

20 Claims. (Cl. 251—50)

Matter enclosed in heavy brackets [ ] appears in the original patent but forms no part of this reissue specification; matter printed in italics indicates the additions made by reissue.

This invention relates to valve constructions for controlling the flow of fluid, and is particularly adapted to the control of high temperature high pressure gaseous fluids such as steam.

This application is a continuation in part of my earlier filed application for "Valve Constructions," Serial No. 596,382 filed June 7, 1945, *now Patent No. 2,621,015*, wherein are disclosed certain improvements in valve body construction which reduce the resistance to the flow of the fluid through the valve body. Included in my improvements are the shaping of the valve closure member or disc guiding ribs so that they assist in directing the fluid flow and offer less resistance thereto, and an improved relation of the valve seat with respect to the valve inlet and outlet passages, and improved streamlining of the interior of the valve body and interior parts therein so that the fluid in its passage from the inlet to the outlet meets with a minimum of resistance. This reduction in resistance to flow results in important savings in costs because of the decrease in power losses. Such power losses are considerable particularly when the valves are used in steam power plants to control the flow of high pressure and high temperature steam flowing at high velocities.

I have provided an improved valve body wherein the inner surfaces are smoothly profiled and changes in shape are provided for accommodation of the valve disc and stem with no obstructions causing abrupt changes in the direction of flow of the fluid. The valve closure member or disc is of a new cross-section which presents a minimum of resistance to the fluid and aids in directing it towards the outlet of the valve body. Novel and improved means for preventing eddying and the like at the bore for the stem are also provided. As a result of the foregoing improvements I provide a valve of greatly improved performance.

It is therefore a primary object of my invention to provide an improved valve body which presents a minimum of interference or resistance to the passage of fluid therethrough. While the invention is illustrated as applied to an angle type non-return valve, it is to be understood that this type is used for illustrative purposes only, and that the novel principles of my invention are equally applicable to globe or straight-through valves to valves in general wherein a closure disc or the like is provided in the valve body and which necessarily lies in the path of the fluid flow.

Another important object of my invention is the provision of an improved valve body having an enlarged portion accommodating a valve disc or the like wherein the interior of the body and the parts therein are so shaped as to direct the fluid from the inlet to the outlet with a minimum of resistance and eddy currents.

Another object is the provision of an improved valve body having an inlet and an outlet connected by smoothly tapering interior walls with an enlarged portion which houses the valve disc or the like.

Still another object of my invention is the provision of an improved valve body having an inlet and an outlet and an enlarged portion housing a valve disc or the like, wherein the valve disc offers a minimum of resistance to fluid flow when unseated, and provided with guiding ribs for the disc which also serve to guide the fluid, the interior of the body being so shaped as to guide the fluid with minimized interference from the inlet to the outlet.

Other objects will become apparent as the description proceeds in connection with the accompanying drawings, wherein.

Figure 1:
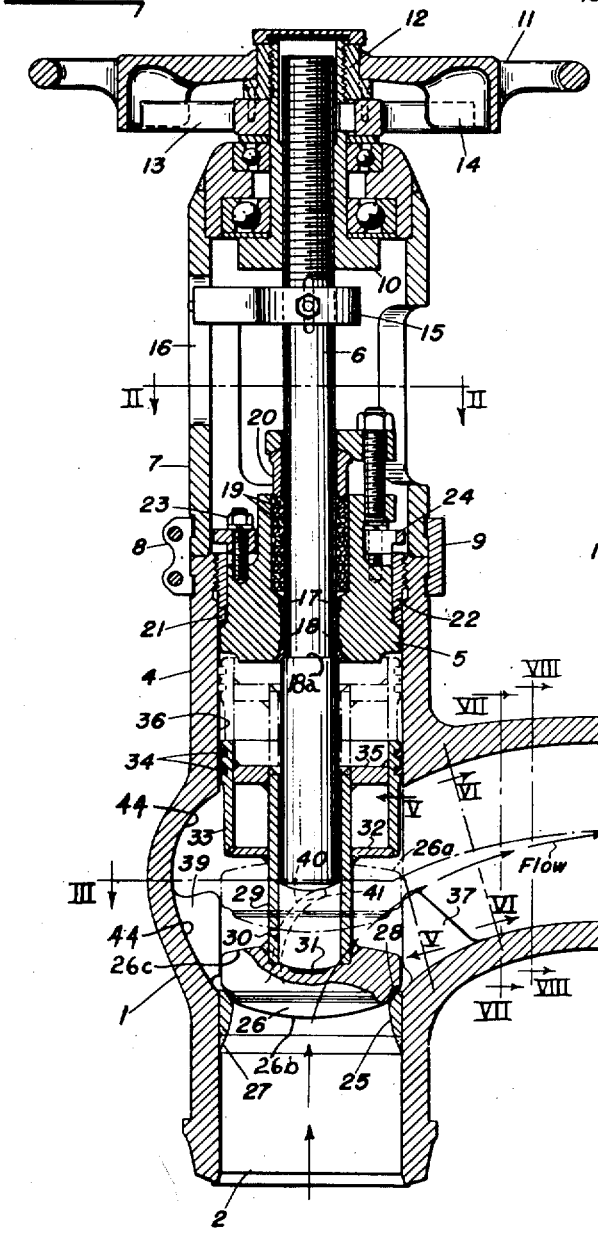
Figure 1 is a vertical central sectional view of an angle valve illustrating an embodiment of my invention.
Figure 2:
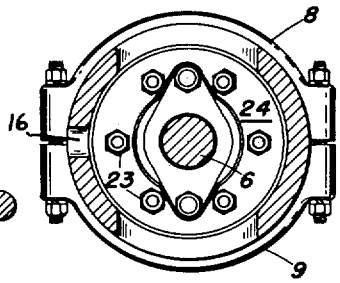
Figure 2 is a section along line II—II of Figure 1.

As shown in Figure 1, a valve body 1 of the angle type has an inlet 2 and an outlet 3 substantially at 90 degrees from the inlet. Coaxial with the inlet 2 the body has a tubular extension 4 wherein is located a bonnet 5 having a central passage for a valve stem 6. A yoke 7 is seated upon and clamped to the top of the extension 4 by lock rings 8 and 9 which engage parallel exterior grooves in the body and yoke. A yoke bushing 10 is rotatably journalled in bearings in the top of the yoke 7 and is internally threaded for engagement with the top of the valve stem 6. An impactor type handwheel 11 is journalled for rotation on a bushing 12 which is fastened to a cross arm 13 keyed to the yoke bushing 10 so that when the handwheel is spun, internal projections 14 thereon will strike the arms of the cross arm 13 to rotate the yoke bushing 10 and raise or lower the valve stem 6. A guide collar 15 is fastened to the stem 6 and extends through an opening 16 in the yoke, thus preventing rotation of the valve stem.

The upper end of the valve stem is thus guided by the yoke. The bonnet 5 provides a second guide means for the valve stem, having bearings 17 and 18 for this purpose. That part of the stem 6 which passes through the bearings 17 and 18 is slightly reduced in diameter, thus forming a shoulder 18a on the stem, which when the stem is in the full raised position engages a coned portion on the bottom of the bearing 18 and seals off the passage in the bonnet 5 against the pressure of the fluid in the valve body 1. Packing 19 in the bonnet is compressed by a gland 20 to insure against leakage of fluid around the valve stem since the shoulder 18a is ineffective as a seal unless the valve is fully open. A sealing gasket 21 is compressed between a shoulder on the bonnet and a retainer 22 which is threaded into the top of the extension 4 on the valve body 1, the bonnet being drawn against the gasket and retainer by means of nuts 23 on top of a bonnet retainer ring 24, as well as by the fluid pressure inside the valve body 1.

That part of the described structure from the bonnet 5 upwards and including the bonnet sealing means etc. does not form any part of this invention but is claimed and more completely described in my copending application for Valve Construction filed April 15, 1946, Serial No. 662,341 *now Patent No. 2,665,875*.

As previously stated, the instant invention relates to improvements in the valve body 1 whereby the fluid is allowed to pass from the inlet 2 to the outlet 3 with a minimum of interference and resistance.

As shown in Figure 1, an annular seat member 25 having an inwardly tapering profile is located within the body 1 adjacent the upper end of the inlet 2 to provide a valve seat for a valve closure member or disc 26. Member 25 may be secured by a weld 27 as shown, which is faired into the profile of member 25 so as to present a smooth slightly constricted inlet to the valve body which will cause a slight increase in velocity of the fluid as it passes into that part of the valve body occupied by the closure member 26.

In Figure 1 the closure member 26 is shown seated and in phantom view it is shown in its raised or full open position at 26a. Also, as shown in Figure 1, the upper surface 26c and the lower surface 26b of the closure member 26 which are exposed to the fluid flow when the valve is open, are of rounded streamlined spherical shape and the closure member in vertical cross section is somewhat elliptical so as to aid, with a minimum of resistance, in directing the flow of fluid in its passage from the inlet 2 to the outlet 3 both above and below the closure member 26. Valve closure member 26 is also provided with a slight peripheral recess adjacent its lower surface 26c to provide a conical shoulder 28 which bears against a mating portion or seat on the annular member 25 when the valve is closed. Welded to and extending upwardly from the closure member 26 is a hollow tubular valve stem 29 provided with a vent 30 adjacent the valve closure member, the bottom of the stem 6 being slidable within the hollow stem 29 to control the position of valve closure member or disc 26 by contact with a bearing surface 31 in the closure member 26. Fixedly attached by welding to the upper end of hollow stem 29 is an enlarged piston formed by a head 35 and a skirt 33 having piston rings 34 adjacent its upper end. An inner wall 32 also connects the piston skirt 33 to the hollow stem 29. Skirt 33 has a sliding fit within the bore 36 of the tubular extension 4 of the valve body. The piston has a dashpot action within said bore, being forced upwardly against the bottom of the bonnet 5 by fluid pressure within the valve body when the valve closure member 26 is fully raised from its seat. When so raised, the wall 32 blocks off the bore 36 thereby avoiding formation of a pocket, and providing a substantially smooth continuation of the inner surface of the valve body thus minimizing turbulence of fluid flow and preventing eddy currents and energy loss in this section of the valve body. When valve closure member 26 is not fully raised the lower end of the piston will project into the hollow space in the valve body, as will be apparent, since it is rigid and moves with the valve closure member. However, even when the closure member 26 is not fully open, the piston causes less disturbance to fluid flow than would be caused by the cavity of the bore 36. In my said parent application Serial Number 596,382 I disclose a series of spaced discs on the piston 29 which provide closures for the bottom of bore 36 when the valve is not fully open.

In valves of the type described herein it has been common practice in the past to have straight ribs extending from the inner wall of the valve body towards the valve disc to guide the valve disc axially in its movement toward and from its seat. Such ribs insure the correct guidance of the disc so that it will engage its seat properly and provide a proper closure therewith. Such ribs are necessarily located in the path of flow of the fluid through the valve body, and they are open to the objection that they impede the flow of fluid through the valve and create turbulence eddy currents and energy losses.

Figure 4:
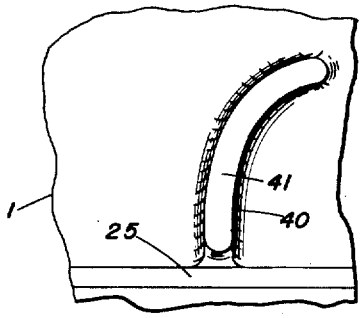
Figure 4 is a view in side elevation of one of the curved guiding ribs as viewed from a position indicated by line IV—IV of Figure 3, and showing the curvature of the ribs.
Figure 3:
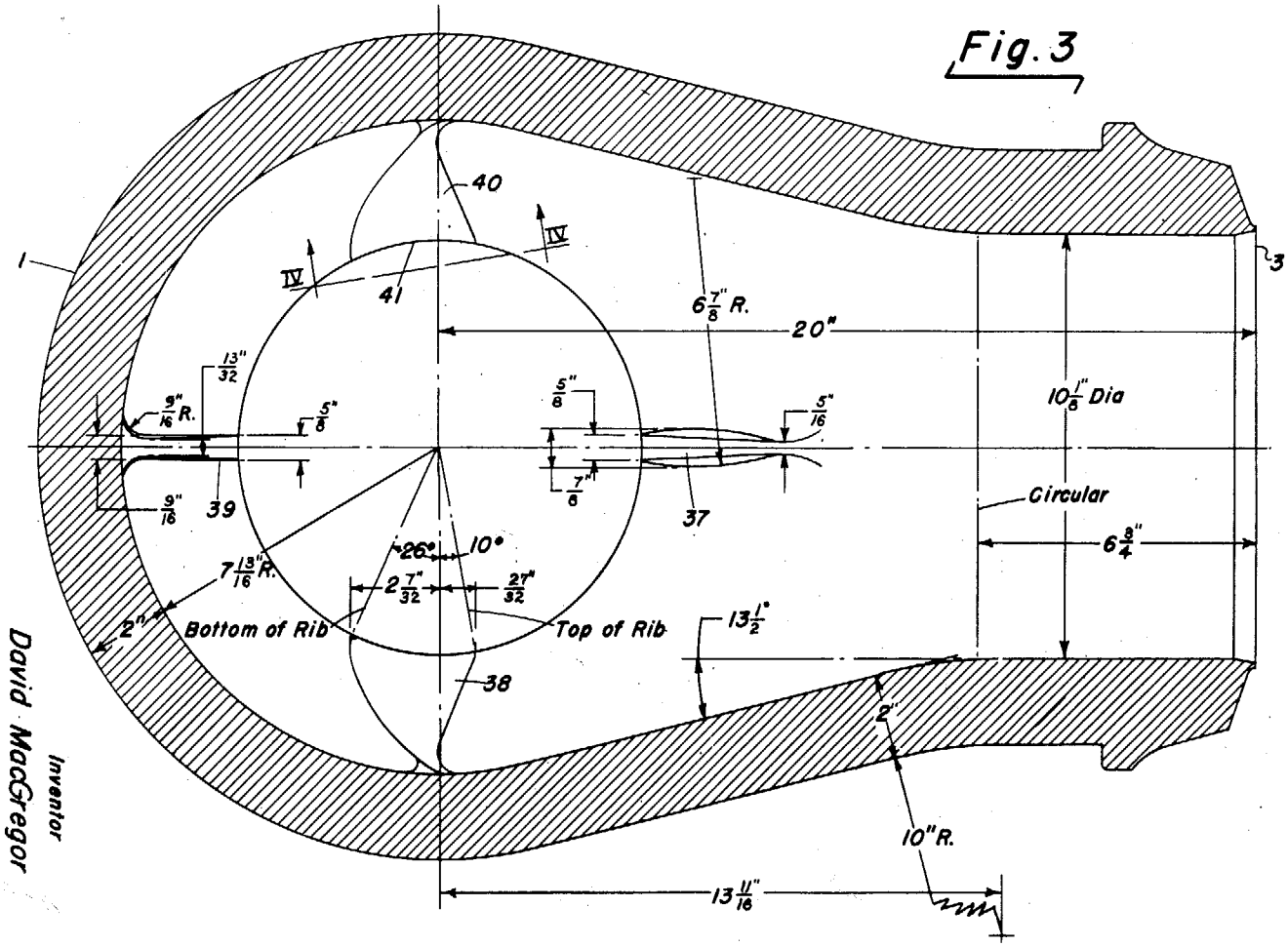
Figure 3 is a sectional view of the valve body along line III—III of Figure 1, the valve disc, piston and stem being omitted.
Figure 7:
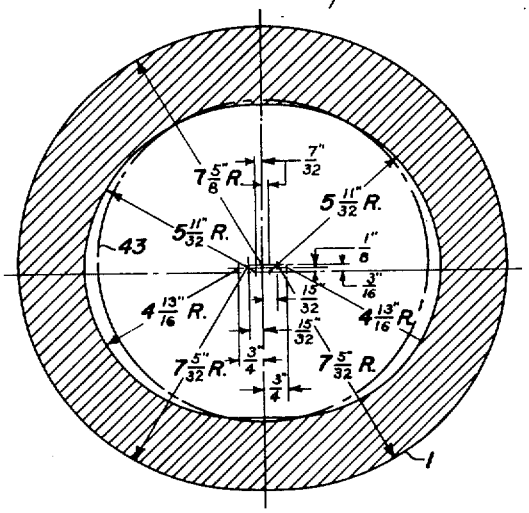
Figure 7 is a sectional view substantially along the line VII—VII of Figure 1.
Figure 8:
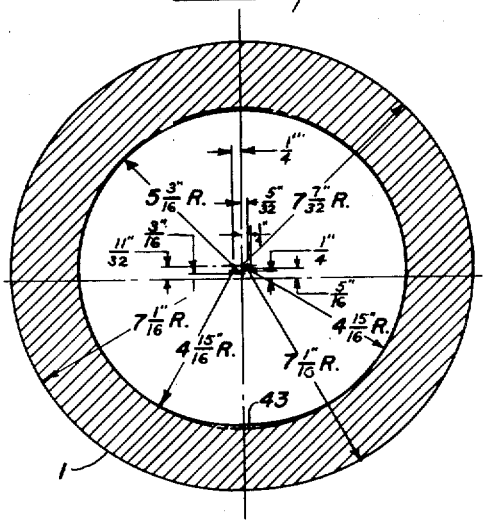
Figure 8 is a sectional view substantially along the line VIII—VIII of Figure 1.
Figure 6:
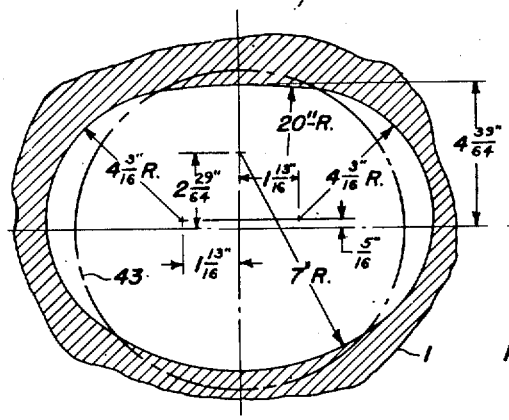
Figure 6 is a sectional view substantially along the line VI—VI of Figure 1.
Figure 5:
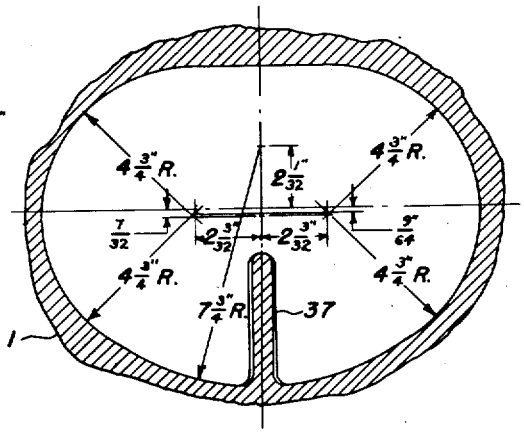
Figure 5 is a sectional view substantially along the line V—V of Figure 1.

In the illustrated embodiment of my invention I employ four guide ribs spaced substantially 90 degrees apart as best shown in Figure 3. Two of these ribs 37 and 39 lie substantially in the common vertical plane of the axes of the inlet 2 and outlet 3 and are contoured to avoid impeding the fluid flow. The other two ribs 38 and 40 are curved in the direction of fluid flow, the curvature of rib 40 being shown in elevation in Figures 1 and 4. As clearly shown in Figure 4 these ribs curve toward the outlet 3 more rapidly at their upper portions than at their lower portions. Rib 38 is similarly curved in the same direction, as will be understood. The inner edges of the ribs 37 to 40 provide guiding surfaces with which the valve disc 26 has a sliding engagement throughout its opening and closing movements to assure that it remains in alignment with its seat. Preferably, the inner edges of the ribs are machined so that they form portions of a cylinder. That part of rib 40 which forms one of said cylindrical portions is indicated by the reference number 41 in Figures 1 and 4. The ribs 37 to 40 begin just above the valve seat and extend nearly half way toward the bore 36 as shown in Figure 1, so that they are still engaged by the valve disc when it is in its full open position indicated at 26a.

As previously described, the cross-sectional area through which the fluid flow passes is nearly constant beyond the constriction formed by the annular member 25, so that in the case of gaseous fluids there will be substantially no expansion or compression thereof in the valve body, although I prefer that the cross-sectional passage area around the valve disc in its open position be somewhat greater than the passage areas in the inlet 2 and outlet 3. In order to provide sufficient interior space within the valve body for passage of the fluid and to permit such passage with a mimimum of losses, the valve body is enlarged in the region surrounding the valve disc 26 in its full open position. This enlarged interior cross-sectional area occurs in the plane of the section of Figure 1 as well as in the section of Figure 3. As shown in Figure 1 the interior of the valve body tapers inwardly more rapidly above the line III–III than below that line, so that the fluid is directed smoothly towards the section indicated by the line V—V into the outlet portion of the valve body.

The sections shown in Figures 3 and 5 to 8 show how the cross-sectional area of the fluid passageway through the interior of the valve body gradually changes from a wide passageway of relatively short height to the nearly circular passageway in the approach to the end of the outlet 3 where the cross-section is a true circle. Each of Figures 6, 7 and 8 has imposed thereon a dot dash circle 43 which represents the circular cross section of the valve outlet 3 at a point indicated by line 43—43 of Figure 1. These circles 43 offer a comparison of the true sections at these points with the circular section at the end of the outlet 3. Preferably the area of the passage around the valve disc in open position is somewhat greater than the passage areas in the inlet 2 and the outlet 3. This provides a gradually tapering passageway from the enlarged portion around the position of the fully raised valve disc to the circular section 43 adjacent the egress end of outlet 3. The interior of the enlarged portion of the body surrounding the valve disc 26 is of an inverted pear-shaped cross section with the stem portion extending downward to the upper end of the annular seat member 25, as will be seen by the outline of the interior surface indicated by the reference numerals 44 in Figure 1. Also, in the section of Figure 3 the interior is somewhat pear-shaped although the transverse sections in the outlet 3 change from elliptical to circular as the egress end of outlet 3 is approached. For purposes of an illustrative example only, Figures 3 and 5 to 7 show the dimensions of the interior of a preferred design of valve body embodying my invention, of such size that the circular inlet 2 and egress end of outlet 3 have interior diameters of 10⅛ inches.

Seat 25 and ribs 38 and 40 are so located, and ribs 38 and 40 are so curved, and the interior of the valve body is so shaped that approximately two-thirds of the volume of fluid flow through the body passes between the ribs 38 and 40 and raised valve disc 26 in full open position directly into the outlet of the valve body while the remaining one-third will pass around the edges of the valve disc and be directed to the outlet 3 by the inner walls of the valve body and by the piston head 32 which closes the bore 36. The rounded and streamlined upper and lower surfaces of the valve disc offer very much less resistance to the passage of the fluid that passes around the disc and over the surfaces thereof than do the former type of valve discs one of which is shown at 42 in the dotted line phantom view of Figure 9.

Figure 9:
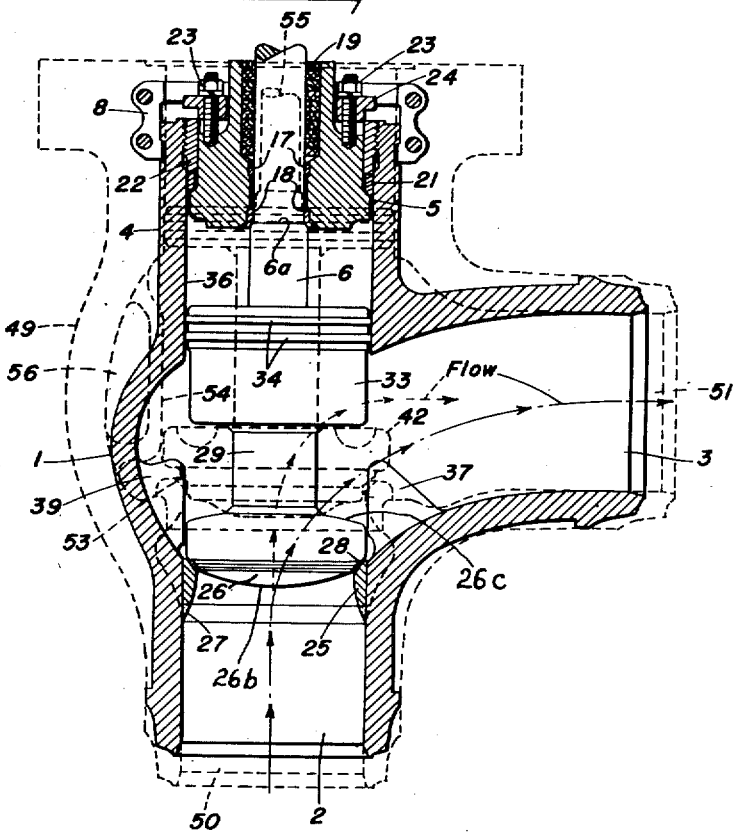
Figure 9 is a sectional view of the valve body of Figure 1 combined with a superimposed phantom view of an old style valve body for the same pipe size to illustrate the differences in valve seat arrangement and metal distribution.

In Figure 9 is shown in solid lines the valve body, curved ribs and disc etc. constructed in accordance with my invention as described above. Superimposed over my improved valve is a phantom view in dotted lines of the prior valve body of a like size designated by the reference number 49. In this former style body the inlet 50 and outlet 51 join the central body section more abruptly as shown, and their interior cross-sections are circular. The valve disc 42 is of heavier construction than my improved valve disc 26 and is provided with irregular surfaces which cause extreme turbulence of the fluid passing around the valve. The valve seat 53 is seated in an internal shoulder which projects abruptly into the path of the fluid flow and lies well up in the enlarged portion of the valve body 49 just below the axis of the outlet 51. The valve disc guide ribs (only one of which is shown at 54) are all parallel to the valve stem 55 and have openings 56 therethrough and the central body section is more or less spherical in shape rather than pear-shaped as in my improved valve. Thus Figure 9 illustrates how my construction provides reduced obstruction to flow of the fluid as compared to conventional valve construction, with considerably less metal and weight in a valve of the same size, and with considerably less flow and pressure losses in the valve. It also shows how the lowering of the valve seat well below the axis of the outlet 3 and substantially at the intersection of the inlet 2 with the enlarged portion of the body 1 permits the fluid to change direction in a gradual curve rather than abruptly as it does in the old style valve body where the valve seat 53 is in a much higher relative position.

The invention may be embodied in other specific forms without departing from the spirit or essential characteristics thereof. The present embodiment is therefore to be considered in all respects as illustrative and not restrictive, the scope of the invention being indicated by the appended claims rather than by foregoing description, and all changes which come within the meaning and range of equivalency of the claims are therefore intended to be embraced therein.

What is claimed and desired to be secured by United States Letters Patent is:

1. A valve construction comprising a hollow body having an inlet and outlet connected to an enlarged portion, all having axes lying in one plane, said outlet having a curved axis in said plane whereby the change in direction of fluid flow occurs partly in said outlet, said enlarged portion providing a housing for a valve closure member operable to coact with a seat to control the fluid flow, the cross section of said outlet adjacent said enlarged portion being substantially of the same shape and size as the cross section of said enlarged portion at their intersection and the inner walls of said enlarged portion and outlet merging in a smooth continuous surface devoid of rapid changes in direction, the internal cross sectional section of said outlet changing from a substantially elliptical shape where it joins said enlarged portion to a circular section at the end thereof.

2. The valve construction described in claim 1 wherein said enlarged portion is provided with inwardly extending ribs curved toward said outlet to direct the fluid flow thereto.

3. The valve construction described in claim 1 wherein said enlarged portion is provided with inwardly extending ribs curved toward said outlet to direct fluid flow therethrough, the inner edges of said ribs forming spaced portions of a cylindrical surface for guiding a valve closure member substantially coaxially with said inlet.

4. The valve construction described in claim 1 wherein said enlarged portion is provided with inwardly extending ribs from a point adjacent said inlet to approximately the largest part of said enlarged portion, said ribs being curved toward said outlet to direct the fluid flow thereto, the curvature of said ribs being smaller adjacent said inlet than at their other ends.

5. The valve construction described in claim 1 wherein a seat for a valve closure member is provided substantially at the juncture of the enlarged portion of said hollow body with said inlet.

6. A valve construction comprising a hollow body having an inlet and an outlet connected to an enlarged portion, all having axes lying in one plane, said outlet having a curved axis in said plane whereby the change in direction of fluid flow occurs partly in said outlet, the cross section of said outlet adjacent said enlarged portion being substantially of the same shape and size as the cross section of said enlarged portion at their intersection and the inner walls of said enlarged portion and outlet merging in a smooth continuous surface devoid of rapid changes in direction, the internal cross sectional section of said outlet changing from a substantially elliptical shape where it joins said enlarged portion to a circular section at the end thereof; means forming a valve seat substantially at the juncture of said enlarged portion of said hollow body with said inlet; a valve closure member in said enlarged portion, movable away from said seat to a raised position, and towards said seat for engagement therewith to provide a closure; and inwardly extending ribs in said enlarged portion, said ribs being curved toward said outlet to direct flowing fluid thereto, the inner edges of said ribs forming spaced portions of a cylindrical surface for guiding said valve closure member perpendicularly to said valve seat.

7. A valve comprising a hollow body having an inlet and an outlet, said inlet and outlet being connected by an enlarged portion; a valve seat adjacent the juncture of said inlet and said enlarged portion and at an angle to said outlet, a valve closure member in said enlarged portion movable away from said seat to a raised position and towards said seat to provide a closure therewith; and inwardly extending ribs in said enlarged portion, said ribs being curved toward said outlet to direct flowing fluid thereto, the inner edges of said ribs forming spaced portions of a cylindrical surface for guiding said valve closure member perpendicularly to said valve seat.

8. A valve construction comprising a hollow body and angularly related inlet and outlet portions communicating therewith, the cross section of said outlet portion adjacent said body being of substantially the same shape and size as that of said body at their intersection, the inner surfaces of said body and said outlet having changing merging curvatures; a valve seat normal to the axis of said inlet portion adjacent the entrance from said inlet to said body; said body having a bore opposite to and substantially coaxial with said inlet portion and normal to said valve seat; a valve closure member having upper and lower smooth convex flow directing surfaces wholly within said body movable away from said seat to a raised position and toward said seat to provide a closure therewith, the cross-sectional area of the passageway through said body being greater in the region adjacent the raised position of said closure than in either of said inlet or outlet portions; and means attached to and spaced from said valve closure member operable to provide a smooth continuous inner surface at the entrance to said bore when the valve closure member is fully raised but projecting into said body when the valve closure member is only partly raised so that fluid may flow through said body with a minimum of disturbance.

9. A valve construction comprising a hollow body having angularly related inlet and outlet portions, a valve seat within said body adjacent said inlet portion, a valve closure member movable within said hollow body toward and away from said valve seat to control fluid communication between said inlet and outlet portions, and a plurality of curved guide means for said closure member formed integrally with said hollow body having a first portion substantially parallel to the axis of said inlet portion and having a second portion angularly inclined with respect to said first portion in the direction of fluid flow to direct fluid through said hollow body toward said outlet portion.

10. A valve construction according to claim 1 in which said enlarged portion is formed with a plurality of inwardly extending circumferentially spaced ribs, at least one of said ribs being flat and being disposed in said one plane, and two of said ribs being disposed at opposite sides of said enlarged portion and curved toward said outlet to direct fluid flow thereto.

11. A valve construction according to claim 10 in which the inner edges of said ribs form spaced portions of a cylindrical surface co-axial with said inlet to guide said valve closure member for movement toward and away from said seat.

12. A valve comprising a body having an inlet passage, an outlet passage disposed at an angle to said inlet passage, and a connecting passage between said inlet and outlet passages, a valve seat at the juncture of said inlet and connecting passages, a valve member axially movable to and from said valve seat, said member comprising a disk having a flow diverting surface opposed to the valve seat, and flow directing vanes internally formed on the wall of said connecting passage intersecting said surface of said valve member in its open position and circumferentially spaced about said valve seat, said vanes extending from said valve seat for the major part of the distance to a plane parallel to said seat and containing the axis of said outlet passage, said plane being above the level of said surface of said valve member, and having a linear curvature from said seat toward the ingress end of said outlet passage presenting concave flow directing surfaces to the fluid stream and cooperating with said flow diverting surface of said valve member when in open position to directly discharge the fluid stream along a curvilinear path from said connecting passage into said outlet passage.

13. A valve construction as defined in claim 12 wherein the periphery of said valve member is substantially tangent to the ingress end of said outlet passage.

14. The valve construction as defined in claim 12, wherein the inner edges of said vanes define segments of a cylindrical surface guidably controlling axial movement of the valve member.

15. A valve comprising a body having inlet and outlet passages and a connecting passage between its inlet and outlet passages that is smoothly curved and free from abrupt change of direction and free from back-pressure producing obstruction, said valve body having a valve seat between said inlet and connecting passages of an inner diameter gradually constricted in the direction of fluid flow therethrough whereby the velocity of flow through said connecting passage is substantially greater than the velocity of the flow of said fluid in said inlet passage, a valve disk movable axially from and towards said valve seat, a dash pot structure carried by said valve body including a cylindrical bore opening into said connecting passage and a piston in said cylindrical bore and a rigid member connecting said piston with said valve disk, closure means secured to and movable with said valve disk and closing the inner end of said cylindrical bore when said valve disk is in its fully opened position and thereby smoothly continuing the surface of said connecting passage at the inner end of said cylindrical bore, and flow directing ribs carried by said valve body and extending into said connecting passage, said ribs having surfaces conformed to engage fluid flowing in said connecting passage and to discharge said fluid in the direction of flow through said connecting passage.

16. A valve comprising a body having inlet and outlet passages and a connecting passage between its inlet and outlet passages that is smoothly curved and free from abrupt change of direction and free from back-pressure producing obstruction, said valve body having a valve seat between said inlet and connecting passages of an inner diameter gradually constricted in the direction of fluid flow therethrough whereby the velocity of flow through said connecting passage is substantially greater than the velocity of the flow of said fluid in said inlet passage, a valve disk movable axially from and towards said valve seat, a dash pot structure carried by said valve body including a cylindrical bore opening into said connecting passage and a piston in said cylindrical bore and a rigid member connecting said piston with said valve disk, closure means secured to and movable with said valve disk and closing the inner end of said cylindrical bore when said valve disk is in its fully opened position and thereby smoothly continuing the surface of said connecting passage at the inner end of said cylindrical bore, and flow directing ribs carried by said valve body and extending into said connecting passage, said ribs having surfaces conformed to engage fluid flowing in said connecting passage and to discharge said fluid in the direction of flow through said connecting passage, said ribs having edge surfaces adjacent said valve disk and constituting guiding ribs for said valve disk.

17. A valve comprising a body having inlet and outlet passages and a connecting passage between said inlet and outlet passages that is smoothly curved and free from abrupt change of direction and free from back-pressure producing obstruction, said valve body having a valve seat between said inlet and connecting passages of an inner diameter gradually constricted in the direction of flow therethrough whereby the velocity of flow through said connecting passage is substantially greater than the velocity of flow of said fluid in said inlet passage, a valve disk movable axially from and towards said valve seat, a dash pot structure carried by said valve body and including a cylindrical bore opening into said connecting passage and a piston in said cylindrical bore and rigidly connected with said valve disk, closure means secured to and movable with said valve disk and closing the inner end of said cylindrical bore when said valve disk is in its fully opened position and thereby smoothly continuing the surface of said connecting passage at the inner end of said cylindrical bore, a first and straight rib carried by said valve body and extending into said connecting passage in the plane of flow in said connecting passage, and second and curved ribs carried by said valve body and extending into opposite sides of said connecting passage, and each of said second ribs having a curved surface engaging fluid flowing in said connecting passage and changing the direction of flow of said engaged fluid and discharging the same in the direction of fluid flow through said connecting passage.

18. A valve comprising a body having inlet and outlet passages and a connecting passage between said inlet and outlet passages that is smoothly curved and free from abrupt change of direction and free from back-pressure producing obstruction, said valve body having a valve seat between said inlet and connecting passages of an inner diameter gradually constricted in the direction of flow therethrough whereby the velocity of flow through said connecting passage is substantially greater than the velocity of flow of said fluid in said inlet passage, a valve disk movable axially from and towards said valve seat, a dash pot structure carried by said valve body and including a cylindrical bore opening into said connecting passage and a piston in said cylindrical bore and rigidly connected with said valve disk, closure means secured to and movable with said valve disk and closing the inner end of said cylindrical bore when said valve disk is in its fully opened position and thereby smoothly continuing the surface of said connecting passage at the inner end of said cylindrical bore, a first and straight rib carried by said valve body and extending into said connecting passage in the plane of flow in said connecting passage, and second and curved ribs carried by said valve body and extending into opposite sides of said connecting passage, and each of said second ribs having a curved surface engaging fluid flowing in said connecting passage and changing the direction of flow of said engaged fluid and discharging the same in the direction of fluid flow through said connecting passage, all of said ribs having edge surfaces adjacent said valve disk and constituting guidings ribs for said valve disk.

19. In a valve construction, a valve body having inlet and outlet passages and a connecting passage between said inlet and outlet passages; a valve seat between said inlet passage and said connecting passage; a valve disk movable axially from and towards said valve seat; a bore in said valve body coaxial with said valve seat; said bore being large enough for passage of said valve disk therethrough during assembly; first guide means for said valve disk comprising an element slidably mounted in said bore, and means rigidly connecting said element and said valve disk, said means being smaller in diameter than said valve disk or element; second guide means for said valve disk comprising a series of spaced fixed vanes in said connecting passages, extending towards the axis of said valve disk and their inner edges providing segments of a cylindrical surface for guiding the valve disk in its movements, said vanes being curved in the direction of fluid flow from said valve seat to said outlet passage; and closure means carried by the means connecting the valve disk and slidably mounted element, said closure means being operable to close the end of said bore facing the valve disk when the valve disk is raised from its seat.

*20. The valve construction described in claim 1, including means defining a valve seat adjacent said outlet portion and a rib extending from a point adjacent said seat into said outlet substantially centrally of said outlet, said rib extending at least to the end of the opening stroke of said closure member and having a surface forming a guide and support surface for said closure member during its movement.*

References Cited in the file of this patent or the original patent

UNITED STATES PATENTS

| | | |
|---|---|---|
| 571,612 | Eichhorn | Nov. 17, 1896 |
| 697,284 | Skiffington | Apr. 8, 1902 |
| 1,195,429 | Acton | Aug. 22, 1916 |
| 1,825,378 | Wilson | Sept. 29 ,1931 |
| 1,890,357 | Barber | Dec. 6, 1932 |
| 2,090,381 | Zagorski | Aug. 17, 1937 |
| 2,091,669 | Bryant | Aug. 31, 1937 |
| 2,225,872 | Langmyhr | Dec. 24, 1940 |
| 2,269,404 | Haves | Jan. 6, 1942 |

FOREIGN PATENTS

| | | |
|---|---|---|
| 144,547 | Austria | 1936 |
| 294,278 | Italy | 1932 |
| 299,608 | Italy | 1932 |
| 611,764 | Germany | 1936 |